United States Patent
Kim (10) Patent No.: US 7,559,079 B2
(45) Date of Patent: Jul. 7, 2009

(54) REALTIME SERVICE SYSTEM USING THE INTERACTIVE DATA COMMUNICATION AND METHOD THEREOF

(76) Inventor: Sang-Duck Kim, 401-Sanggi ristbill, 106-1 Chungdam-Dong, Gangnam-gu, Seoul, 135-100 (KR)

(*) Notice: Subject to any disclaimer, the term of this patent is extended or adjusted under 35 U.S.C. 154(b) by 585 days.

(21) Appl. No.: 10/525,120

(22) PCT Filed: Dec. 31, 2002

(86) PCT No.: PCT/KR02/02505

§ 371 (c)(1),
(2), (4) Date: Feb. 18, 2005

(87) PCT Pub. No.: WO2004/019218

PCT Pub. Date: Mar. 4, 2004

(65) Prior Publication Data

US 2005/0240976 A1    Oct. 27, 2005

(30) Foreign Application Priority Data

Aug. 22, 2002  (KR)  ............. 10-2002-0049714

(51) Int. Cl.
*H04N 7/173* (2006.01)
*H04N 7/16* (2006.01)

(52) U.S. Cl. .............. 725/100; 725/110; 725/131; 725/139; 725/151

(58) Field of Classification Search ........... 724/100, 724/110, 131, 139, 151
See application file for complete search history.

(56) References Cited

U.S. PATENT DOCUMENTS

2002/0144262 A1* 10/2002 Plotnick et al. ........... 725/32
2005/0097599 A1*  5/2005 Plotnick et al. ........... 725/32
2006/0159116 A1*  7/2006 Gerszberg et al. ........... 370/431

FOREIGN PATENT DOCUMENTS

| KR | 2001-0002246 | 1/2001 |
| KR | 2001-0084040 | 9/2001 |
| KR | 2001-0091883 | 10/2001 |
| KR | 2002-0038067 | 5/2002 |

* cited by examiner

*Primary Examiner*—Christopher Kelley
*Assistant Examiner*—Franklin S Andramuno
(74) *Attorney, Agent, or Firm*—John K. Park; Park Law Firm (57) ABSTRACT

The present invention relates to a real-time service system and method using an interactive data communication for implementing a high quality real time interactive service of a DVD class for various contents with by means of smooth interactive communication between a service provider and a user. The system comprises: a plurality of digital set-top boxes of users for replaying service contents selected by the user in real time through a television by being supplied through a telephone line of a very high-data rate digital subscriber line (VDSL); a number of system operating device installed by a predetermined region unit and connected to the plurality of digital set-top boxes of the users in a corresponding region via a telephone line of the VDSL for supplying the service contents required at a corresponding set-top box in real time by the interactive data communication with an arbitrary digital set-top box; and a service providing device for storing various service contents received from a contents providing device and for supplying the corresponding service contents to a corresponding system operating device in real time in response to a service content request from the system operating device inputted through the Internet. It can overcome the limit of a conventional Internet network in speed by employing VDSL transmission method through a system operating device of a system operator as a franchise of a cyber marker and, at the same time, enables a smooth interactive communication between a service providing device of a service provider and a digital set-top box of a user, thereby realizing a high quality real time interactive service of a DVD class for various contents.

10 Claims, 9 Drawing Sheets

REALTIME SERVICE SYSTEM USING THE INTERACTIVE DATA COMMUNICATION AND METHOD THEREOF

TECHNICAL FIELD

The present invention relates to a real-time service system using an interactive data communication and a method thereof, and, more particularly, to a system and a method for implementing a high quality video on demand (VOD) service of a digital video disk (DVD) class and other various services in real-time by realizing a maximum downstream rate of 25 Mbps and a data rate of 12 Mbps for simultaneous interactive communication based on a very high-data rate digital subscriber line (VDSL) by using a conventional optical communication network and telephone line.

BACKGROUND ART

A content provider or a service provider has distributed a video on demand (VOD) service utilizing a conventional Internet unilaterally. In order to smoothly communicate the VOD image service, it is required to realize a high rate communication of more than 4 Mbps, whereas an asymmetric digital subscriber line (ADSL) has a limit in smoothly implementing a practical VOD image service.

DISCLOSURE OF INVENTION

It is an object of the present invention to solve the above-mentioned problems of the prior arts and to provide a real-time service system using an interactive data communication for implementing a high quality real time interactive service of a DVD class for various contents with by means of smooth interactive communication between a service provider and a user.

It is another object of the present invention to provide a real-time service method using an interactive data communication for implementing a high quality real time interactive service of a DVD class for various contents with by means of smooth interactive communication between a service provider and a user.

To achieve the above objects, there is provided a real-time service system using an interactive data communication in accordance with a preferred embodiment of the present invention, the system comprising: a plurality of digital set-top boxes of users for replaying service contents selected by the user in real time through a television by being supplied through a telephone line of a very high-data rate digital subscriber line (VDSL); a number of system operating device installed by a predetermined region unit and connected to the plurality of digital set-top boxes of the users in a corresponding region via a telephone line of the VDSL for supplying the service contents required at a corresponding set-top box in real time by the interactive data communication with an arbitrary digital set-top box; and a service providing device for storing various service contents received from a contents providing device and for supplying the corresponding service contents to a corresponding system operating device in real time in response to a service content request from the system operating device inputted through the Internet. There is provided a method for implementing a real-time service system using an interactive data communication in accordance with an embodiment of the present invention, the method comprising the steps of: displaying an initial screen representing categories for a plurality of allowable service contents on a monitor of a television related to the digital set-top box in response to the power on of the digital set-top box of a user; if one of the plurality of categories is selected, transmitting a selection signal corresponding to the selected category created at the digital set-top box to a service providing device through a system operating device and displaying detailed selection items of the selected category on the monitor of the television; if one of the plurality of detailed selection items is selected, generating a selection signal corresponding to the selection result at the digital set-top box and transmitting the generated signal to the service providing device through the system operating device; transmitting the service contents based on the selection signal to a corresponding digital set-top box through the service providing device; and replaying the service contents by the television related to the digital set-top box.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Hereinafter, a real-time service system using an interactive data communication and a method thereof in accordance with a preferred embodiment of the present invention will now be described with reference to the accompanying drawings.

Figure 1:
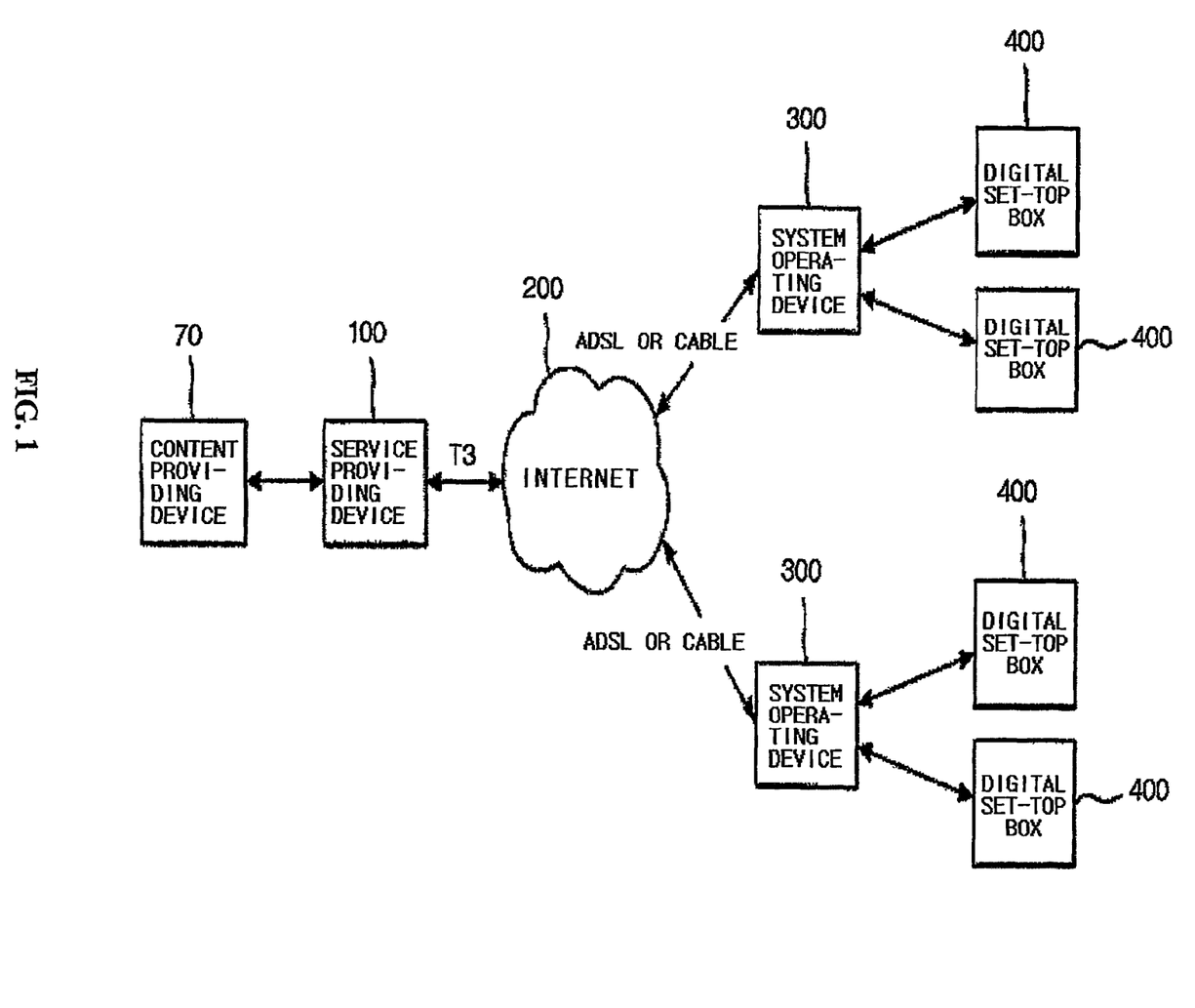
FIG. 1 is a block diagram for representing a structure of a real-time service system using an interactive data communication in accordance with an embodiment of the present invention.

FIG. 1 is a block diagram illustrating a structure of a real-time service system using an interactive data communication in accordance with an embodiment of the present invention, wherein the system includes a plurality of digital set-top boxes 400 of users for replaying service contents selected by the user in real time through a television by being supplied through a telephone line of a very high-data rate digital subscriber line (VDSL), a number of system operating devices 300 installed by a predetermined region unit and connected to the plurality of digital set-top boxes 400 of the users in a corresponding region via a telephone line of the VDSL for supplying the service contents required at a corresponding digital set-top box in real time by the interactive data communication with an arbitrary digital set-top box and a service providing device 100 for storing various service contents received from a contents providing device 70 and for supplying the corresponding service contents to the corresponding system operating device 300 in real time in response to a request of service contents from the system operating device 300 inputted through the Internet 200.

In the real time service system, the contents providing device 70 is managed by a content provider, the service providing device 100 is managed by a service provider and the system operating device 300 is managed by a system operator, i.e., an operator of a cyber shopping mall who has the right of trade.

In FIG. 1, although two system operating devices 300 are described for the sake of explanation, the real time service system can employ further system operating devices, wherein each of the two system operating systems 300 is capable of implementing an interactive data communication with hundreds of digital set-top boxes 400. And, it is possible to construct each system operating devices 300 in such a way that it can implement an interactive data communication with thousands of digital set-top boxes 400 as well as to be expanded.

Figure 2:
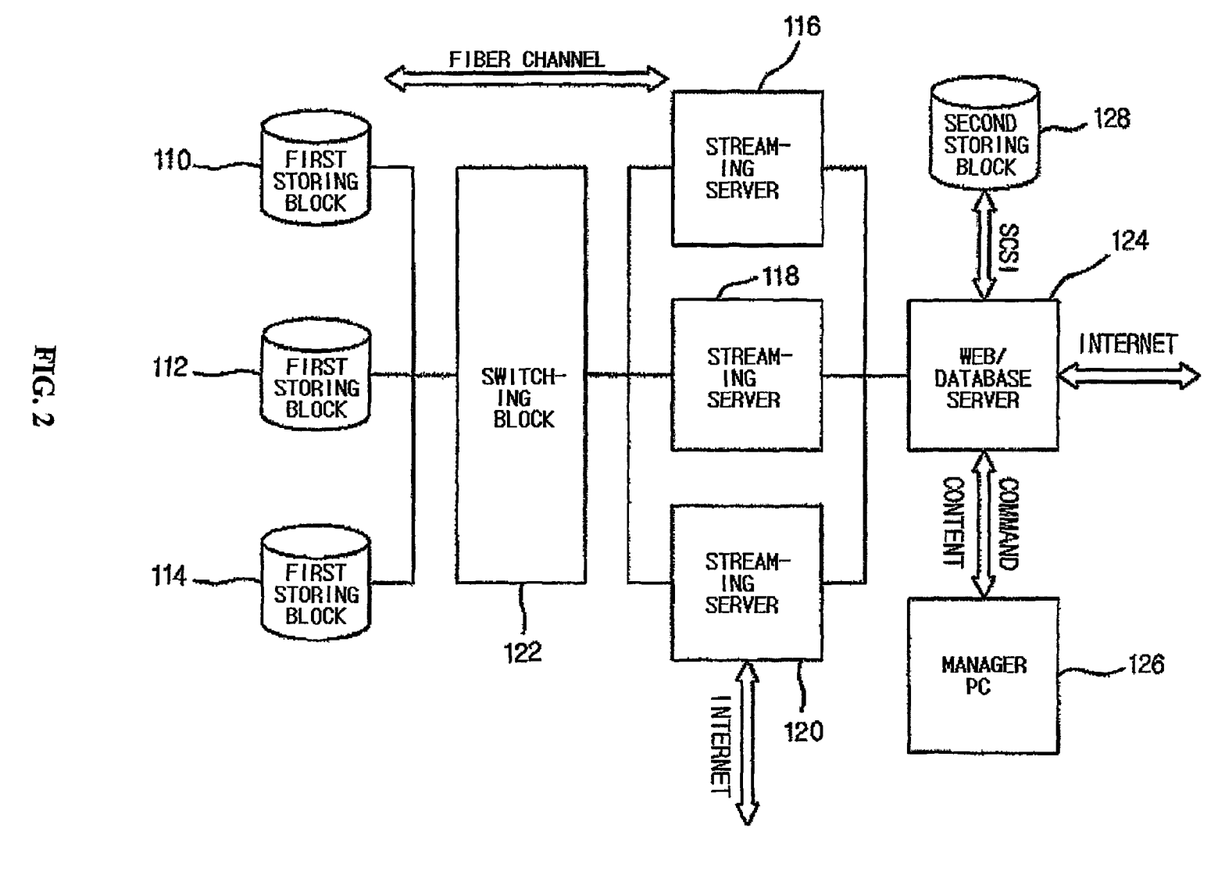
FIG. 2 is a block diagram illustrating an internal configuration of a service-providing device shown in FIG. 1.

As shown in FIG. 2, the service providing device 100 includes a first storing blocks 110, 112 and 114 for storing contents related to various service, streaming servers 116, 118 and 120 for transmitting the service contents stored at the first storing blocks 110, 112 and 114 to the system operating devices 300 through the Internet and for inputting the service contents inputted thereto into the first storing blocks 110, 112 and 114, a switching block 122 installed between the first storing blocks 110, 112 and 114 and the streaming servers 116, 118 and 120 for switching movements of the service contents between the first storing blocks 110, 112 and 114 and the streaming servers 116, 118 and 120, a web/database server 124 for transferring various service contents supplied from the contents providing device 70 through the Internet to the streaming servers 116, 118 and 120, a second storing block 128 for storing additional information, for example, the serial number and position of each service contents, interface information of each service operating device, interface information of the contents providing device, charging information and information required for the operation of the other service providing devices, of the service contents stored at the first storing blocks 110, 112 and 114 and a manager personal computer (PC) 126 for implementing search, insert, delete, update and reconstruction for the additional information stored at the second storing block 128 by sending a data manipulation language (DML) to the web/database server 124.

It is possible to construct the switching block 122 as a storage area network (SAN), and also in the preferred embodiment of the present invention, although it is called as a SAN switching block, it is not limited thereto, but commonly designates switching functions and devices for accessing various memories.

The Internet coupled to the web/database server 124 connects the service-providing device 100 to the contents providing device 70 each other and the Internet 200 coupled to the streaming servers 116, 118 and 120 connects the service providing device 100 to the system operating device 300.

And, the first storing blocks 110, 112 and 114 representing a large-scale memory can be expanded in case of need and can be used as one storing space by the aid of the switching block 122. That is, the first storing blocks 110, 112 and 114 are separated to a multiple number in a physical sense, but they are one storing space in a logical sense.

The service providing device 100 stores a movie or a valuable data received from the contents providing device 70 into the first storing blocks 110, 112 and 114 and the switching block 122 and the plurality of storing blocks are required since the stored contents are at least from 10 megabits to several gigabits.

Referring to FIG. 2, in accordance with the preferred embodiment of the present invention, the switching block 122 transfers the service contents between the first storing blocks 110, 112 and 114 and the streaming servers 116, 118 and 120 by a fiber channel. Here, although the preferred embodiment of the present invention exemplifies the fiber channel, it is possible to replace the fiber channel with another channel for implementing the same function of the fiber channel.

And also, the streaming servers 116, 118 and 120 supply the service contents to various positions of the system operating device 300 at the same time by using a method for reproducing a voice, an image and an animation or the like on the Internet in real time.

In accordance with the service providing device 100 shown in FIG. 2, for example, if the contents providing device 70 supplies a content of movie such as a "Sen to Chihiro no kamikakushi (Spirited Away)" to the service providing device 100, the service providing device 100 stores the content of movie such as "Sen to Chihiro no kamikakushi (Spirited Away)" supplied from the contents providing device 70 to the first storing blocks 110, 112 and 114.

That is, if the service providing device 100 receives the content of movie such as "Sen to Chihiro no kamikakushi (Spirited Away)" supplied from the contents providing device 70 through the Internet, the web/database server 124 stores the content of movie such as "Sen to Chihiro no kamikakushi (Spirited Away)" to one of the first storing blocks 110, 112 and 114 through the switching block 122. And, an additional information, i.e., a position at which the content of movie such as "Sen to Chihiro no kamikakushi (Spirited Away)" is located and a serial number, an interface information for each of the system operating devices, an interface information for the contents providing device 70 and other various interface information required for the operation of the service providing devices 100, is stored at the second storing block 128 through a small computer system interface (SCSI). And then, the manager PC (126) implements search, insert, delete, update and reconstruction for the data stored at the second storing block 128 by sending a data manipulation language (DML) to the web/database server 124 and the web/database server 124 processes the implemented data into a database and sends the result to the second storing block 128.

Also, while the preferred embodiment of the present invention has been described with respect to the SCSI, other modifications and variations of the interface may be made without departing from the spirit and scope of the present invention.

Figure 3:
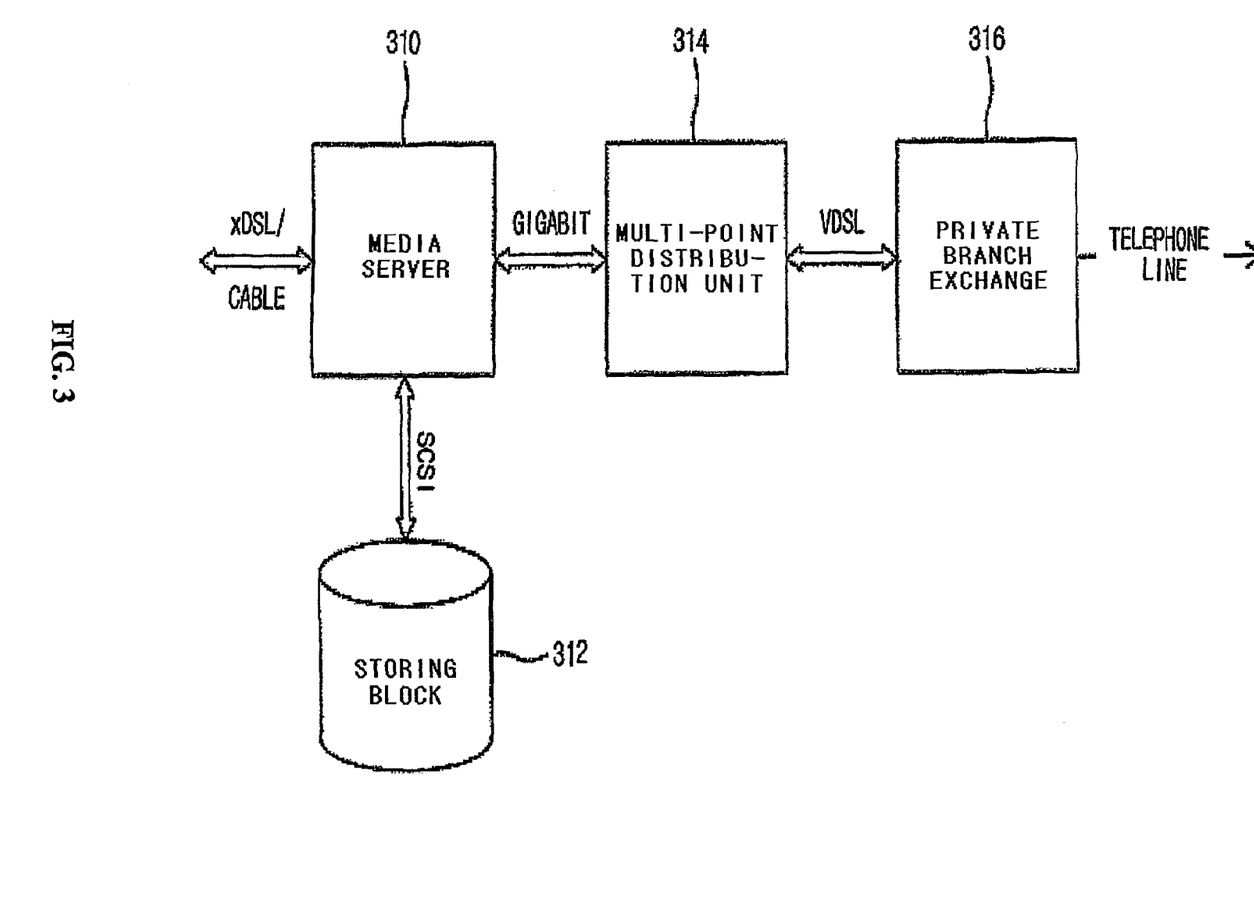
FIG. 3 is a block diagram illustrating an internal configuration of a system-operating device shown in FIG. 1.

Referring to FIG. 3, the system operating device 300 includes a storing block 312 for storing service contents supplied from the service providing device 100, a media server 310 connected to the Internet by a cable or an optical cable for receiving the service contents supplied from the service providing device 100 and for temporally storing the same at the storing block 312 and outputting the same, a multi-point distribution unit 314 for setting a plurality of transmission paths for the service contents outputted from the media server 310 and outputting the same and a private branch exchange 316 for transmitting the service contents from the multi-point distribution unit 314 to a corresponding digital set-top box 400 through the telephone line.

An x digital subscriber line (xDSL) shown in FIG. 3 means various digital subscriber lines and is one of transmission methods for realizing the broadband of subscriber network to additionally secure a high speed data line by using an existing copper subscriber line. That is, the optical cables are installed from the central offices to dense regions and the existing copper telephone lines are utilized from the dense regions to the subscribers, thereby providing the existing telephone service as well as various multimedia services such as a very high speed Internet, a video on demand (VOD), a cable television (CATV) or the like.

In the specification, the xDSL can include an asymmetric digital subscriber line (ADSL), a symmetric digital subscriber line (SDSL), a high-data rate digital subscriber line (HDSL), a broadband digital subscriber line (BDSL) or the like.

The media server 310 which is connected to the streaming servers 116, 118 and 120 of the service providing device 100 by connecting through the cable or the optical cable receives the service contents and stores the received service contents at the storing block 312. And, the media server 310 incorporates therein the function of a voice over Internet protocol (VOIP) router to implement the VOIP service.

And, the multi-point distribution unit 314 and the media server 310 are connected to each other through a communication line. That is, the media server 310 and the multi-point distribution unit 314 are connected to each other through a dedicated line such as a packet communication network provided by the public communication provider, a packet switching network, an integrated services digital network (ISDN) or the like at a transmission rate in the order of gigabits.

Referring to FIG. 3, there is shown a very high-data rate digital subscriber line (VDSL) which is one of high data rate digital transmission methods employing a telephone line, it can transmit the high-rate data asymmetrically in a section having a short transmission distance in comparison with an ADSL as a conventional digital subscriber line. And, the private branch exchange 316 shown in FIG. 3 is connected to the telephone lines of each subscriber's home.

The service providing device 100 employs a push method for automatically transmitting internal information to the clients spontaneously without operating the search of user at the client end in the Internet 200 as a method for providing the service contents to the system operating device 300. And, a pull method for searching the information of the service providing device 300 by the search operation of the user at the client end is employed as the method for providing the service contents to the system operating device 300, in the pull method the system operator 300 requires the service contents to the service providing device 100.

Figure 4:
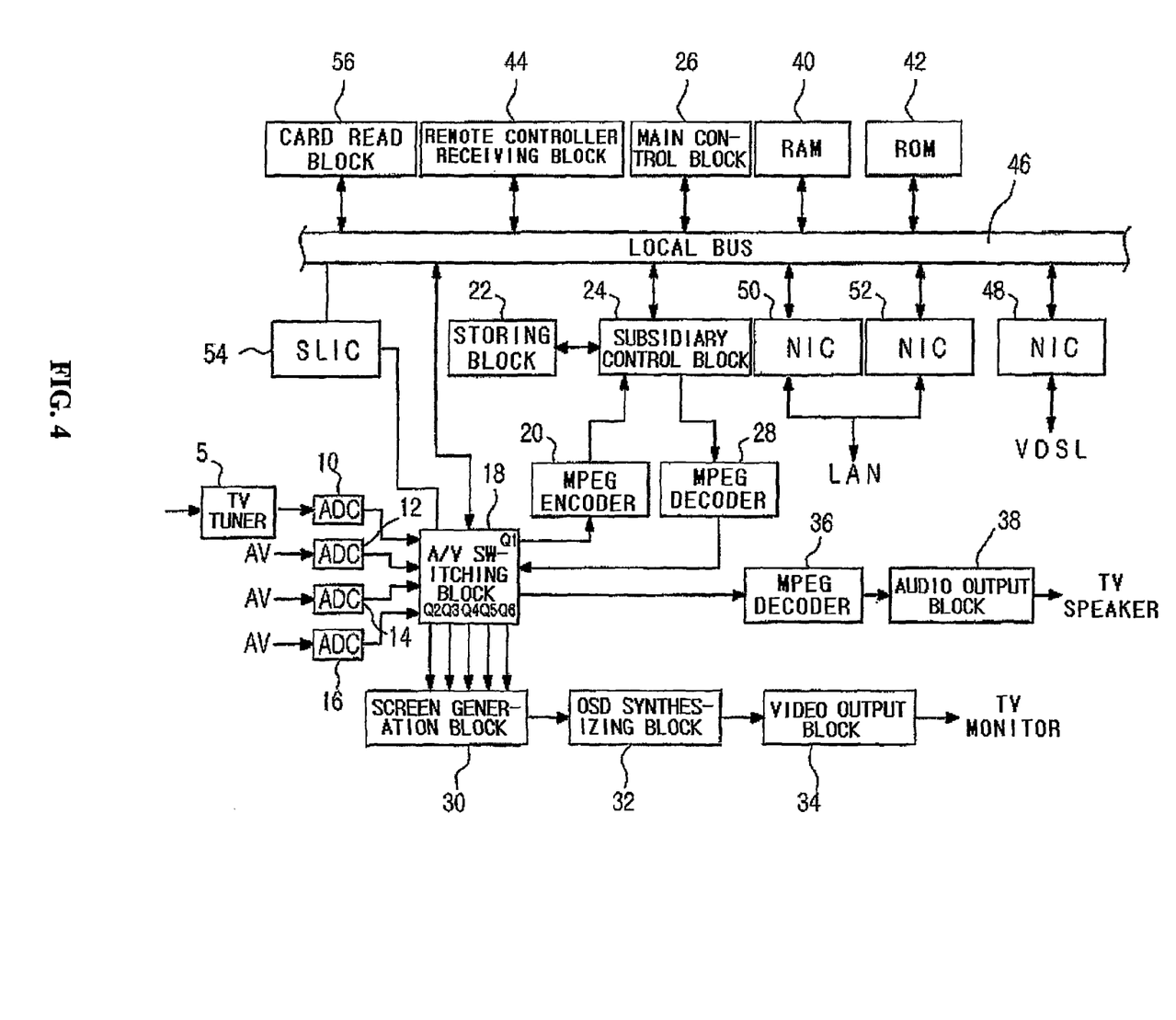
FIG. 4 is a block diagram illustrating a configuration of a digital set-top box shown in FIG. 1.

And, the digital set-top box 400 as shown in FIG. 4 includes a plurality of analog/digital converting blocks 10, 12, 14 and 16 for digital converting by receiving audio/image signals from a plurality of audio/image input sources, e.g., a television tuner 5, a movie camera, VTR, a cable broadcast, a satellite broadcast, a charged coupled display (CCD) camera, mike or the like, an audio/video switching block 18 for outputting an audio/image signal of anyone channel selected from the plurality of channels of audio/image signals supplied from the plurality of analog/digital converting blocks 10, 12, 14 and 16 through a storing signal output port Q1 and for outputting the plurality of channels of audio/image signals and the audio/image signals decoded by a moving picture expert group (MPEG) through a plurality of audio/image signal output ports Q2, Q3, Q4, Q5 and Q6, an MPEG encoder 20 for MPEG encoding by receiving the audio/image signals outputted through the storing signal output port Q1 of the audio/video switching block 18, a storing block 22 in the form of hard disk drive (HDD) for storing the MPEG encoded audio/image signals by the MPEG encoder 20 and for storing MPEG contents inputted through the VDSL line or the LAN line, a subsidiary control block 24 for storing the output data from the MPEG encoder 20 and the MPEG contents inputted through the VDSL line or the LAN line to the storing block 22 and for outputting the data stored at the storing block 22, a main control block 26 for supplying a control signal required for storing and outputting the data to the storing block 22 and for controlling a corresponding operation based on a remote control signal from a remote controller (not shown) of a remote controller receiving block 44, an MPEG decoder 28 for transmitting the data outputted from the subsidiary control block 24 to the audio/video switching block 18 by MPEG decoding, a screen generation block 30 for employing an image signal of anyone channel among the plurality of channels of image signals from the audio/video switching block 18 as a main screen and for employing the other channels of the image signals as a subsidiary screen, an OSD synthesizing block 32 for realizing an appropriate graphic OSD on the screen from the screen generation block 30 by comparing a content of a 24 bit overlay memory (not shown) of RGB 8:8:8 with a specific color key value, i.e., a color value corresponding to an OSD character or a picture required to the screens to be printed, a video output block 34 for displaying the image screen from the OSD synthesizing block 32 to a television monitor (not shown), an audio digital/analog converting block 36 for converting the audio signals of the active channels to the main screen supplied from the audio/video switching block 18, an audio output block 38 for outputting the sound from the audio digital/analog converting block 36 to outside through a television speaker (not shown), a random access memory (RAM) 40 for storing a code of an operating program required to the digital set-top box and a read only memory (ROM) 42 for storing all of programs related to the driving and the controlling of the digital set-top box in accordance with the present invention.

Here, the audio/video switching block 18, the subsidiary control block 24 and the OSD synthesizing block 32 are a field programmable gate array (FPGA) in the form of a logic chip capable of programming.

And, the main control block 26 and the subsidiary block 24 are communicated with each other through a local bus 46. The ROM 42 additionally stores personal information, e.g., name, address, the information of credit card, identification (ID) card information or the like, of the user of a corresponding digital set-top box.

The personal information can be stored at a memory including an additional magnetic card, an IC card or hardware or the like and a device to access the personal information, i.e., a card read block 56 as shown in FIG. 4, is attached to the set-top box of the present invention to be utilized as security and charging information.

And also, the audio/video output means for outputting the audio and image of the plurality channels outputted from the audio/video switching block 18 in response to a selection condition of the user due to the control of the main control block 26 includes the screen generation block 30, the OSD synthesizing block 32, the video output block 34, the audio digital/analog converting block 36 and the audio output block 38 as shown in FIG. 4.

And, the MPEG encoder 20 incorporates therein a buffer (not shown) in the form of a first input first out (FIFO) method and accesses the buffer of the MPEG encoder 20 at the subsidiary control block 24 and the main control block 26 processes only the control order. The main control block 26 processes only the control order and address index for the storing block 22, and the subsidiary control block 24 charges the remaining the load related to the large amount of burst.

The signal received at the remote controller receiving block 44 can be an infrared ray signal as well as a radio signal such as a high frequency, a low frequency or the like.

And also, the VDSL line shown in FIG. 4 is a telephone line and the VDSL line realizes the VOD, whereas the LAN line is an Internet line and two Internet lines configure the LAN line. A network interface cards 48, 50 and 52 are installed between the VDSL line and the two LAN line and the local BUS 46. The network interface cards 48, 50 and 52 allow the digital set-top box to be always connected with the network. In the home network interface cards 50 and 52 connected to the two Internet lines, network address translation (NAT) function is assigned to utilize as a home gateway device. That is, if the user is not in VDSL environment, the user can use the digital set-top box of the present invention by directly connecting the Internet lines, i.e., LAN lines.

And, in the ROM 42 shown in FIG. 4, the digital set-top box incorporates therein a voice over Internet protocol (VOIP) software to implement the VOIP function, in order to implement the VOIP function, one of output terminals of subscriber line interface circuits 54 is connected to the local bus 46 and the other output terminal is connected to the audio/video switching block 18.

And also, although it is not shown in the drawings of the present invention, in the digital set-top box a device can be expanded to access a memory such as a magnetic card, an IC card and a similar hardware or the like and can be provided with a device for supplying USB port or the like.

The SLIC 54 outputs converted digital audio signals by converting the analog audio signal inputted thereto into the converted digital audio signals, the digital audio signals outputted from the output terminal of the SLIC 54 are inputted to the audio/video switching block 18 as well as inputted to the main control block 26 through the local BUS 46.

If the power of the digital set-top box is on in the main control block 26, after the VOIP software stored at the ROM 42 to the RAM 40, the VOIP function are controlled based on the VOIP software. Therefore, the digital set-top box shown in FIG. 4 can play the role of a VOIP phone. That is, in the digital set-top box in FIG. 4, the VOIP function is incorporated therein to transmit the voice and image by using IP.

Referring to FIG. 4, the audio/image signals inputted from the audio/image input sources, i.e., the analog/digital converting blocks 10, 12, 14 and 16, consist of an RCA input and a super video and only one audio/image signal from one of the four input sources is stored at the storing block 22 via the MPEG encoder 20 and the subsidiary control block 24 in response to the control signal of the main control block 26. And, since the four input sources are transmitted the screen generation block 30 in real time, the combination of three channels is displayed at maximum during the display of the stored contents.

The digital set-top box shown in FIG. 4 can be employed at VDSL telephone environment or LAN environment capable of implementing a high-data rate communication at a maximum of 25 megabits per second in one direction and 12 megabits per second in bi-direction, if the network is selected, a current content information is updated through a server (not shown) and a required data is supplied by a request of the user. And also, in order to smoothly process a multi-task, after the data inputted through the network stores at the storing block 22 as a hard disk drive (HDD) so as to implement a time buffering, by reading the data from the storing block 22, the read data are transmitted to the screen generation block 30 through the MPEG decoder 28 and the audio/video switching block 18.

In accordance with the digital set-top box shown in FIG. 4 configured as described above, a conventional PVR function as well as various contents is sufficiently supplied by the VDSL line or the LAN line, and the outputs thereof are allowable.

And, VOD service categorized into contents, an artificial intelligence interactive education service for an education on demand, a home shopping service, a remote monitoring service, a telemedicine service, a visual telephone service, a regional portal service, an Internet telephone service, a home automation service or the like are allowed by utilizing the digital set-top box.

The PVR function enables a viewer of television to digitally record and replay TV broadcasts and includes various features such as pause viewing, search, resume viewing, skip ahead, skip back, back to the point at which a live television broadcast is played, slow motion, genre search with a time schedule received by using an electronic program guide, and time schedule search.

The artificial intelligence interactive education service includes a service capable of suggesting a contest of a predetermined test and suggests an appropriate education program in response to the test result when the user, e.g., a learner, selects the content of education among the VOD service categories.

The home shopping service supplies the purchase information of a goods, e.g., a character and an affiliated specific goods, appearing during the show time of the VOD as well as supplies in the form of screen, whereby the consumer easily purchases various goods and charging between the consumer and the buyer are automatically realized by an automatic charging function.

The remote monitoring service means a service capable of inspecting by connecting to a site at a remote region or inspecting later by storing the images photographed by the CCTV at the digital set-top box connected to the CCTV when the user goes out.

The telemedicine service means a service capable of implementing a medical treatment in catechetical between a patient and a doctor remote from each other with showing each of images and painful portions by the digital set-top box.

The visual telephone service means a service capable of implementing a visual communication with the opponents at anytime and anywhere through PIP.

The regional portal service means a service for supplying various announcements of public institutions in a region, regional news, time schedule of regional meetings, visual meeting information, information of restaurants in the region, food order service, CCTV display in the apartment complex and the like to the user.

The various services described above does not limited thereto, it can be modified and changed without departing from the spirit of the present invention. For example, it is possible that a home automation service, an Internet telephone service or the like is implemented by using the digital set-top box.

The Internet telephone service means a function of processing a telephone call free of charge or at a low cost by connecting both communication networks with a gateway so as to implement a telephone call between the IP telephone users as well as a telephone call between the IP telephone user and a public switched telephone user.

The home automation service includes:

first, a house keeping for maintaining a residential environment convenient and easy at home by automating a light, an air conditioner, a security facility or the like;

second, a home management for predicting or checking a household management, a health management, a schedule management or the like by using a personal computer;

third, a service function related to an education and a culture for realizing an amusing and creative home life such as a cultural information, an education or the like through a data communication as well as the receptions of a radio and TV or the like; and fourth, a communication for receiving information of politics, economics, general society or the like to home through a PC communication network as well as for communicating with outside at garden by a wireless telephone.

The storing operation of MPEG data during the operation of the digital set-top box 400 configured as described above is described as follows: the audio/image signals form the television tuner 5 of the various audio/image input sources are inputted to the analog/digital converting blocks 10, 12, 14 and 16, respectively; and the inputted audio/image signals in the form of analog are converted into digital signals in each of the analog/digital converting blocks 10, 12, 14 and 16 and the converted digital signals are transmitted to the audio/video switching block 18. Thereafter, in the audio/video switching block 18, an audio/image signal in the form of digital of only one channel among the signals from the four input sources inputted through the four analog/digital converting blocks 10, 12, 14 and 16 is transmitted to the MPEG encoder 20. The audio/image signal of the one channel transmitted to the MPEG encoder 20 is transmitted to the main control block 26 as an audio/image signal of the channel selected by the user. The MPEG encoder 20 MPEG encodes the inputted audio/image signal of the one channel to send the signal to the main control block 24 and the subsidiary control block 24 stores the inputted MPEG data to the storing block 22 by index. After the storing of the MPEG data to the storing block 22 is finished, the subsidiary control block 24 sends an alarm signal to represent the finish of the MPEG data store to the main control block 26 through the local BUS 46.

Here, the MPEG data stored at the storing block 22 can be a data related to a broadcasting program which is a record reservation previously set by the user, can be an audio/image data recorded by a movie camera or VTR, can be an audio/image data supplied by a cable broadcasting system or a satellite broadcasting system or can be an image data recorded by CCD camera. And, the MPEG data stored at the storing block 22 can be a data of MPEG contents, e.g., inputted through VDSL line or LAN line, inputted through the network interface cards 48, 50 and 52. That is, the MPEG data stored at the storing block 22 is an MPEG data since its data input is realized by 6 channels, specifically, the VDSL line, the LAN line and the analog/digital converting blocks 10, 12, 14 and 16, selected by the user.

As a result, the storing of the MPEG data to the storing block 22 is finished.

This MPEG data storage is carried out when the user reserves the auto recording of a broadcast program or orders the recording of audio/image information from audio/image input sources by manipulating a remote controller (not shown).

On the other hand, the output operation of the MPEG data during the operation of the digital set-top box 400 is described as follows.

The audio/video switching block 18 transmits the image signal supplied from the four analog/digital converting blocks 10, 12, 14 and 16 and the image signal from the MPEG decoder 28 to the screen generation block 30. At this time, the audio/video switching block 18 sends the audio signal of the channel enabled as an active screen to the digital/analog converting block 36. The screen generation block 30 implements a PIP process in such a way that four image signals among the image signals inputted from the five channels are displayed on a subsidiary screen and sends the remaining one active image signal to the OSD synthesizing block 32 by processing as a main screen. The number of screens outputted at the screen generation block 30 can be 5 at maximum or 1 at minimum, but it must be determined based on the remote control signal remotely received by the operation of the remote controller (not shown) in response to the determination of the user.

In the OSD synthesizing block 32, a content of a 24 bit overlay memory (not shown) of RGB 8:8:8 is compared with a specific color key value, i.e., a color value corresponding to an OSD character or picture required to the screens to be printed and sends the compared value to the video output block 34 by realizing an appropriate graphic on each of the screens from the screen generation block 30.

Thereafter, the video output block 34 displays on the television monitor the screens of each of the channels realizing the graphic OSD through the television monitor. When the audio/video switching block 18 sends the image signals supplied from the four analog/digital converting blocks 10, 12, 14 and 16 and the image signals from the MPEG decoder 28 to the screen generation block 30, the audio/video switching block 18 sends the audio signals of the channel enabled as the active screen, i.e., the main screen, to the audio digital/analog converting block 36 simultaneously. Resultantly, the audio digital/analog converting block 36 transmits the inputted audio signal in the form of digital signal to the audio output block 38 by converting the inputted audio signal into the digital signal, whereas the audio output block 38 outputs the audio of the channel enabled as a current active screen through the television speaker.

The output operation of the MPEG data as described above is implemented when the user orders the output of the MPEG data stored at the storing block 22 by controlling the remote controller (not shown).

Hereinafter, a personal video recorder (PVR) function of the digital set-top box 400 is described with reference to the flowchart shown in FIGS. 5 to 8.

Figure 5:
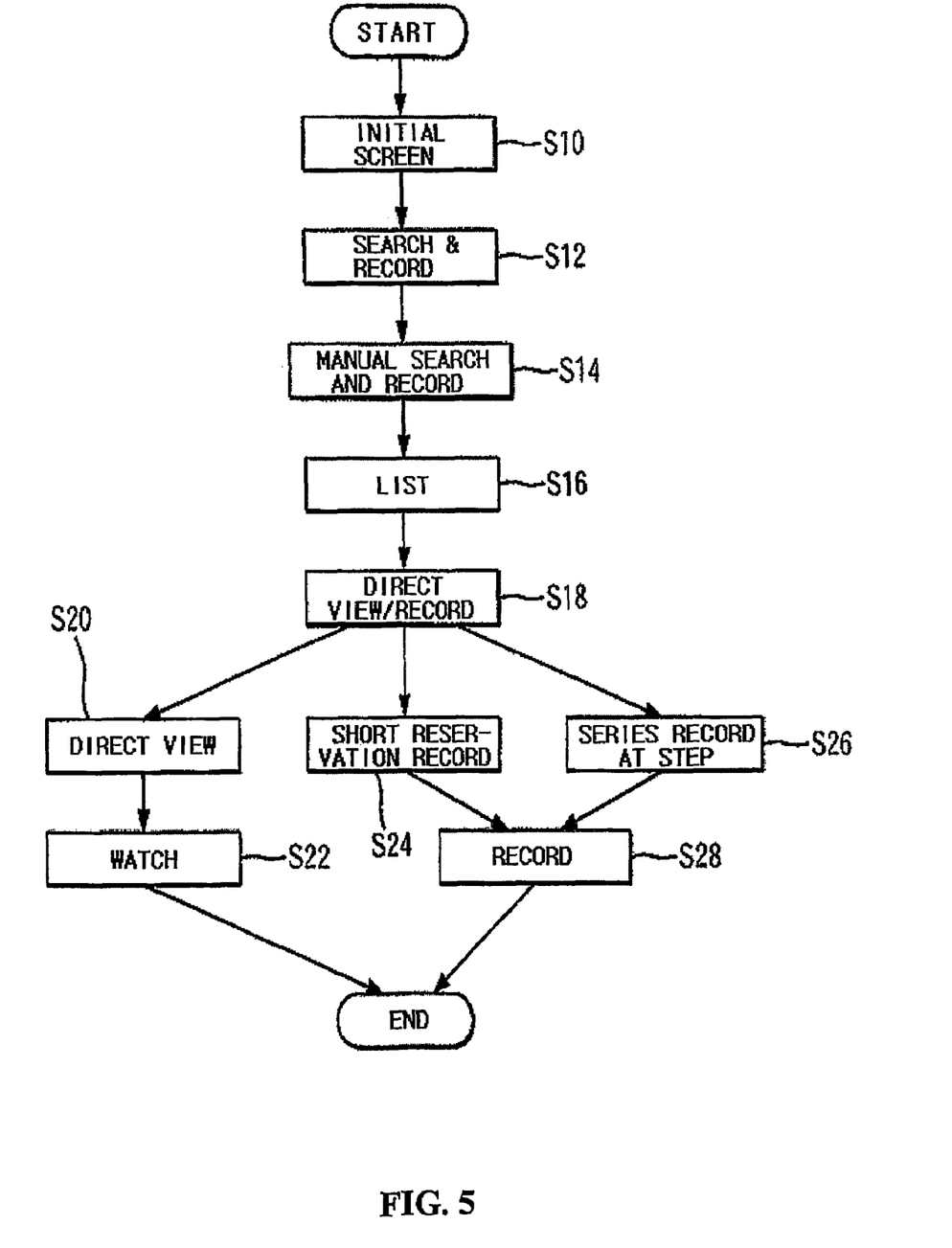
FIGS. 5 to 8 are flow charts showing a personal video recorder (PVR) function of the digital set-top box shown in FIG. 1.

At first, a manual search and record in accordance with the flowchart, as shown in FIG. 5, is described.

If the user turns on the digital set-top box 400, an initial screen is displayed on a monitor of television related to the digital set-top box 400 at step S10. Thereafter, the user selects "search and record" at the displayed initial screen, the user selects "manual search and record" as a detailed selection item at steps S12 and S14.

In the next step, a list is displayed on the monitor of the television at step S16; and, after the user selects a desired genre from the displayed list, the user selects direct view or record at "direct view/record" representing direct viewing or recording at step S18.

Accordingly, in the case when the user selects the direct view at step S20, the movie in the genre selected by the corresponding user is supplied from the digital set-top box 400 to the television to be output, whereby the corresponding user directly watches the movie at step S22.

On the other hand, in case when the user selects short reservation record at step S24 or selects series record at step S26, the short subject selected by the corresponding user is reserved to be recorded or the series is recorded at step S28.

Figure 6:
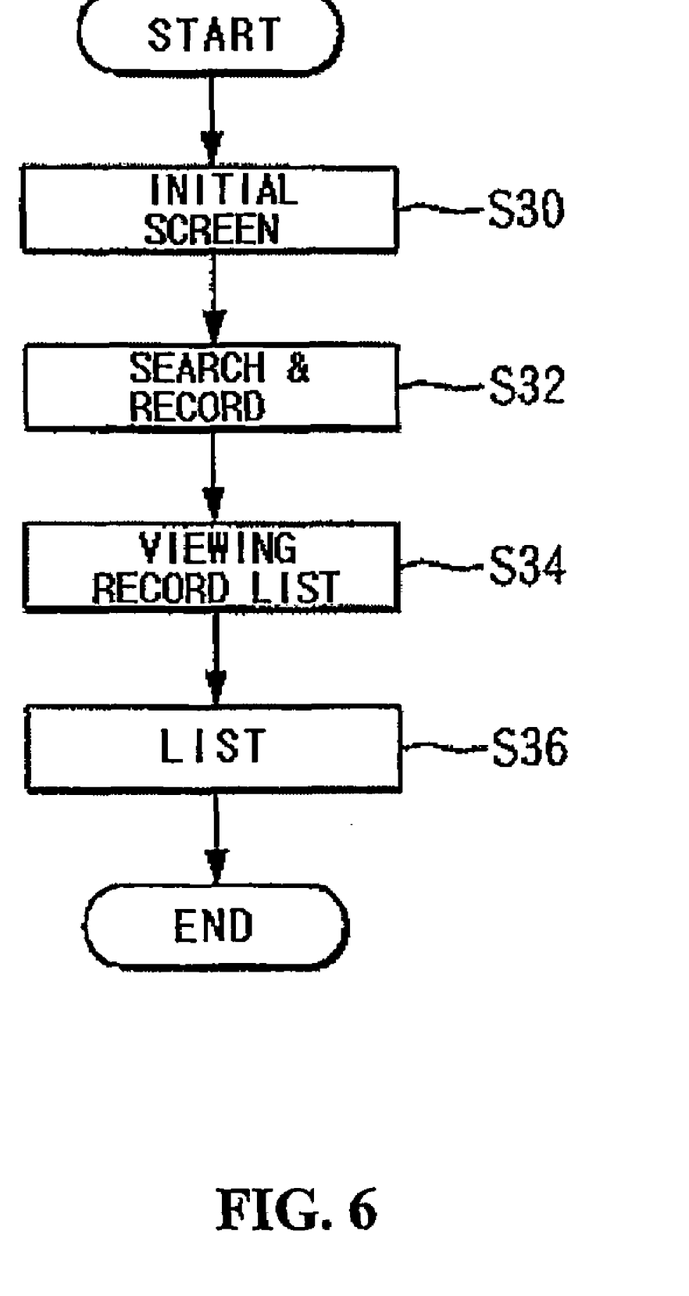

At this time, a record list view for a flowchart shown in FIG. 6 is described hereinafter.

When the user turns on the digital set-top box 400, a predetermined initial screen is displayed on the monitor of television related to the digital set-top box 400 at step S30. Thereafter, the user selects "search and record" at the predetermined initial screen at step S32 and selects "record list view" as a detailed selection item at step S34.

As a result, the digital set-top box 400 displays the record list previously stored at the inside of the digital set-top box 400 on the monitor of the television at step S36.

Figure 7:
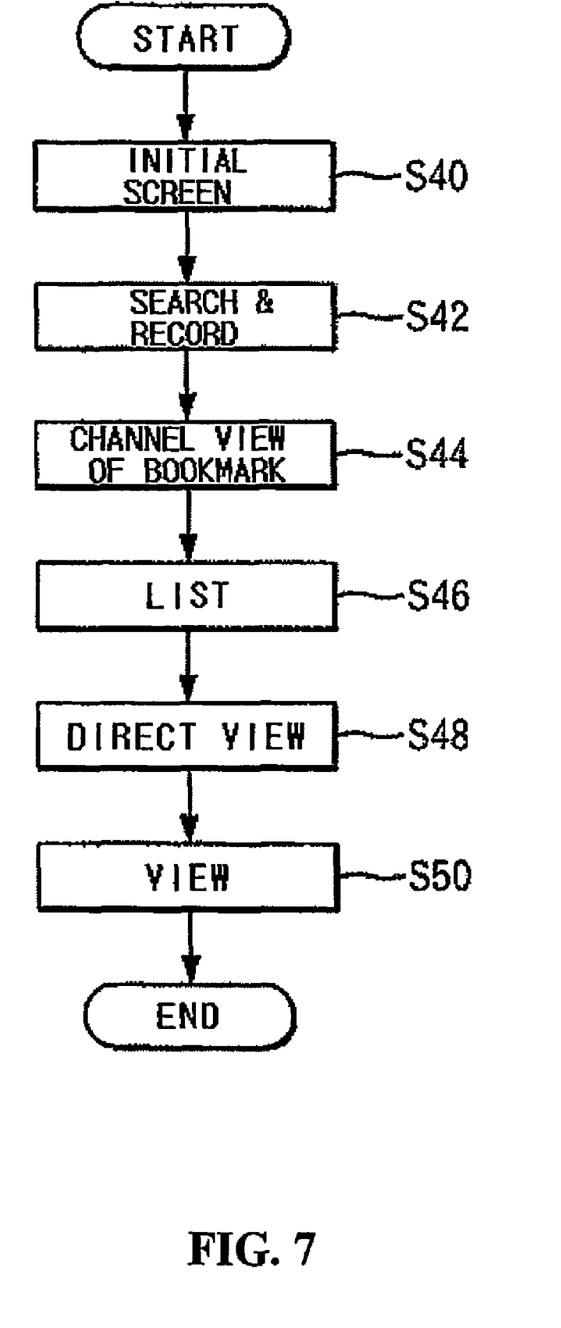

A channel view of bookmark is described hereinafter with reference to a flowchart shown in FIG. 7.

If the user turns on the power of the digital set-top box 400, a predetermined initial screen is displayed on the monitor of the television related to the digital set-top box 400 at step S40. After the user selects "search and record" at the predetermined initial screen, the user selects "channel view of bookmark" as a detailed selection item at steps S42 and S44.

Resultantly, the digital set-top box 400 displays the list of channel view of bookmark previously stored at the inside of the digital set-top box 400 on the monitor of the television at step S46, and the user selects a direct view for a desired channel with viewing the displayed list for the channel view of bookmark at step S48. Accordingly, the user can directly view the broadcast program of the selected channel at step S50.

Finally, a time schedule search and record is described hereinafter with reference to a flowchart shown in FIG. 8.

Here, the time schedule may include EPG which is automatically downloaded by being supplied from the service provider.

If the user turns on the power of the digital set-top box 400, a predetermined initial screen is displayed on the monitor of television related to the digital set-top box 400 at step S60, after the user selects "search and record" at the displayed predetermined initial screen, the user selects the "time schedule search and record" as a detailed selection item at steps S62 and S64.

In the following step, a predetermined time schedule is displayed on the monitor of the television at step S66. Thereafter, the user selects a desired broadcast program from the displayed time schedule, and directly selects "direct view/record" representing direct view or record at step S68.

Resultantly, in case when the user selects the direct view at step S70, the corresponding user directly views the selected broadcasting program at step S72.

On the other hand, in case when the user selects short reservation record at step S27 or selects series record at step S76, the short subject selected by the corresponding user is reserved to be recorded or the series is recorded at step S78.

Meanwhile, if the user pushes the record button in the need of the record during the viewing of the broadcast without recording, the contents of the broadcast after being pressed are recorded and the contents of the broadcast before being pressed are not recorded, but only a portion of contents of broadcast desired to be recorded by the user is recorded. In this case, in accordance with the preferred embodiments the present invention, if the user is viewing a broadcast program by selecting a desired broadcast program at a schedule time list search and a record mode, the corresponding broadcast program is temporally stored at a storing block before a record button is pressed. Thereafter, if the user presses the record button to record the selected broadcast program, the present invention records the contents of the broadcast program previously and temporally stored and the contents of the broadcast program after the push of the record button.

Figure 8:
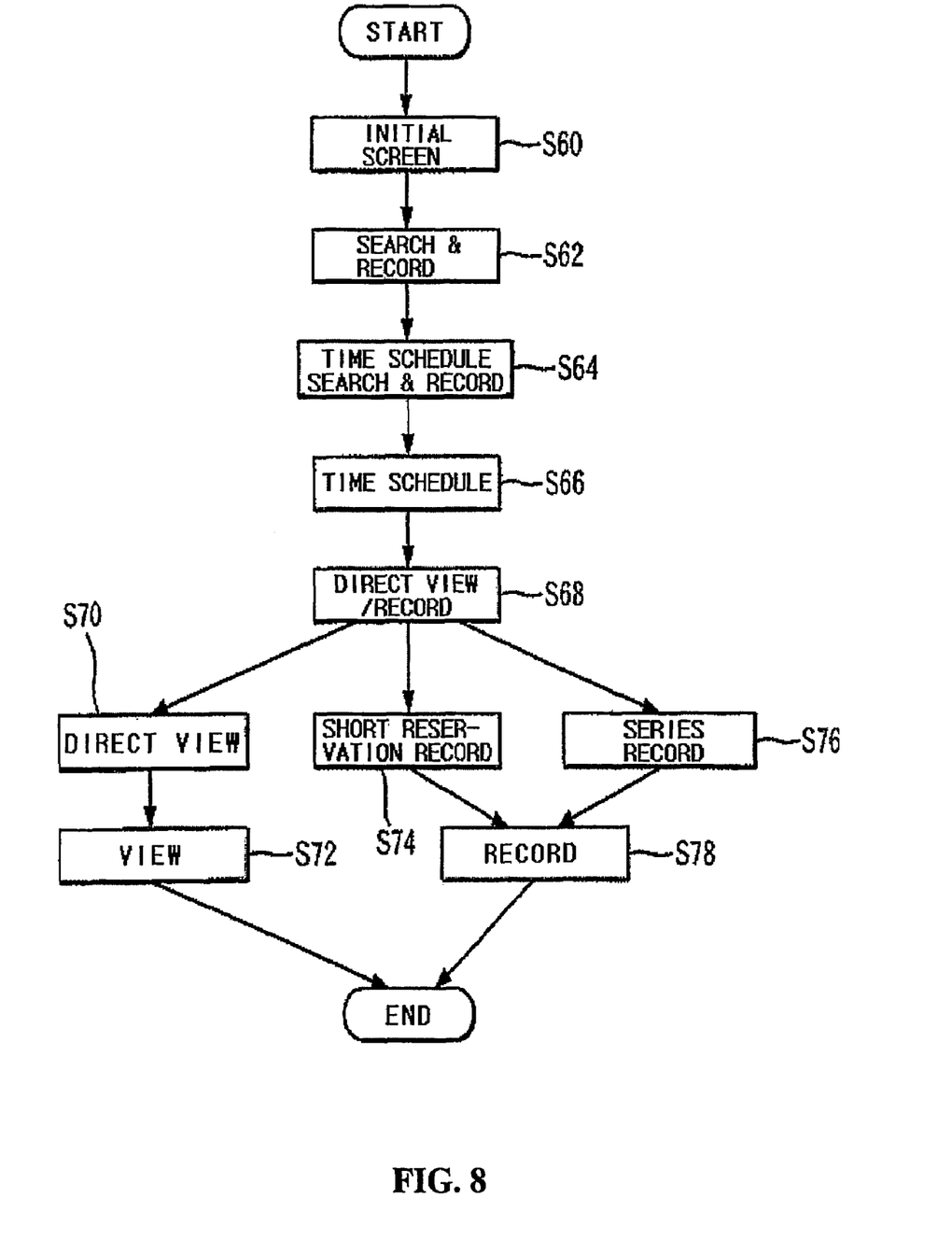

And, the time schedule of FIG. 8 can be upgraded by a program supplied from the service providing device 100.

Figure 9:
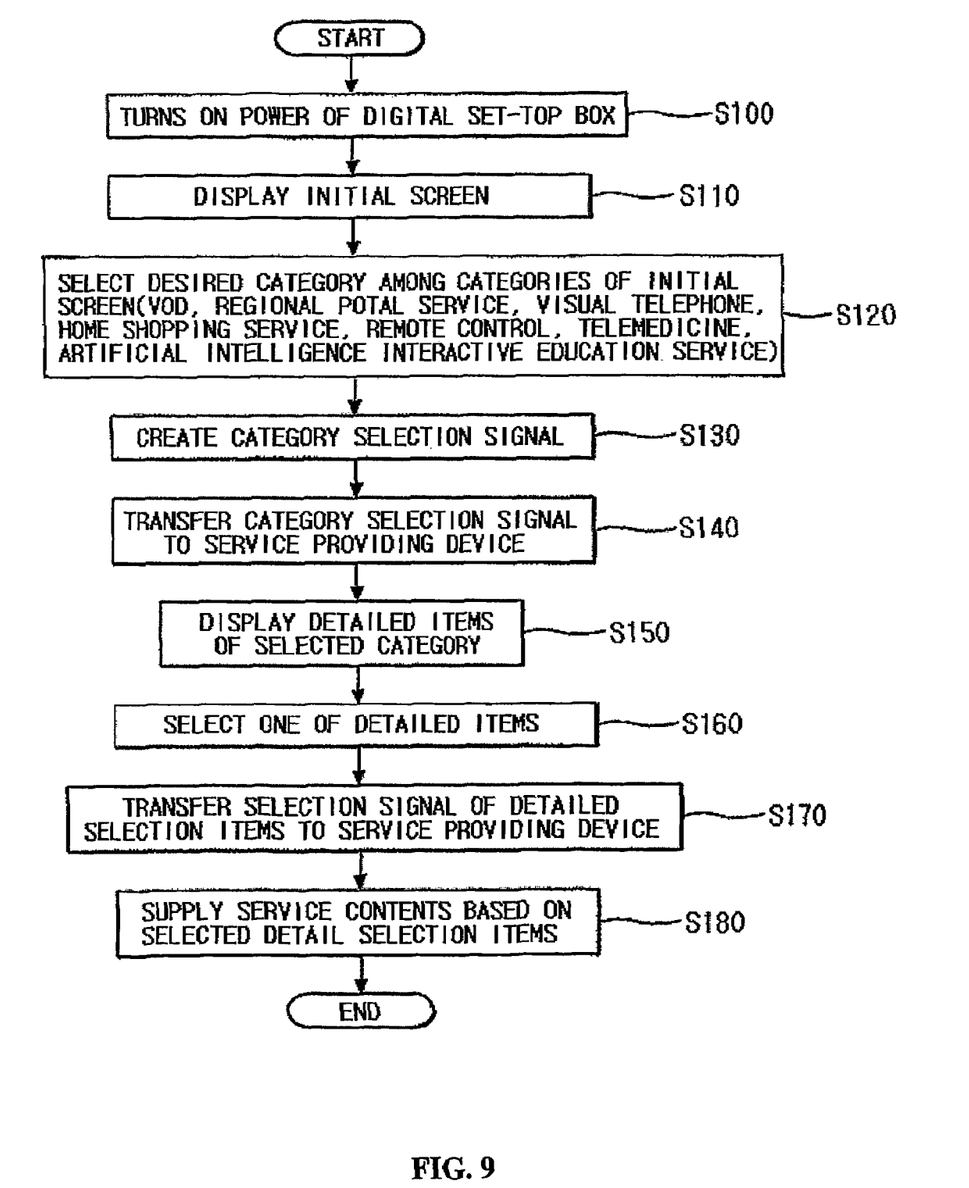
FIG. 9 is a flow chart illustrating a real-time service method using an interactive data communication in accordance with the embodiment of the present invention.

A method for implementing a real-time service system using an interactive data communication in accordance with the preferred embodiment of the present invention is described hereinafter with reference to a flowchart as shown in FIG. 9.

If the user turns on the power of the digital set-top box 400 at step S100, an initial screen representing a plurality of categories, e.g., video on demand, a regional information, a visual communication, a home shopping, a remote monitoring, a telemedicine, a tele-education or the like, is displayed on the monitor of the television related to the digital set-top box 400 at step S110.

If the user inputs a key corresponding to anyone number of the category selected from the categories by operating the remote controller (not shown) at step S120, in the digital set-top box 400, a selection signal corresponding to the received input signals, i.e., the desired category number, is generated at step S130, and the selection signal is transmitted to the service providing device 100 through the system operating device 300 and the Internet 200 as well as the detailed selection items of the selected category are displayed on the monitor of the television at steps S140 and S150. Here, although the preferred embodiment of the present invention describes in case that the detailed selection items are selected after the generation of the selection signal, it is possible to change its order.

If the user selects anyone detailed selection item among the plurality of detailed selection items displayed on the monitor of the television at step S160, in the digital set-top box 400, the selection signal corresponding thereto is created and the created selection signal is transmitted to the service providing device 100 through the system operating device 300 and the Internet 200 at step S170.

Accordingly, in the service providing device 100, the service contents corresponding based on the selection signal, i.e., a signal representing the meaning of the selected detailed selection item, are transmitted to the corresponding digital set-top box 400 through the Internet 200 and the system operating device 300, whereas in the digital set-top box 400, the received service contents are displayed on the monitor of the television at step S180.

The real time content service in accordance with the preferred embodiment of the present invention described above is realized for free and chargeable contents. In case of the chargeable contents, e.g., VOD, charging is automatically implemented by the automatic charging device (not shown).

INDUSTRIAL APPLICABILITY

In accordance with the present invention described above, it can overcome the limit of a conventional Internet network in speed by employing VDSL transmission method through a system operating device of a system operator as a franchise of a cyber marker and, at the same time, enables a smooth interactive communication between a service providing device of a service provider and a digital set-top box of a user, thereby realizing a high quality real time interactive service of a DVD class for various contents.

While the present invention has been described with respect to the preferred embodiments, other modifications and variations may be made without departing from the spirit and scope of the present invention as set forth in the following claims.

The invention claimed is:

1. A real-time service system using an interactive data communication, the system comprising:
a plurality of digital set-top boxes of users for replaying service contents selected by the user in real time through a television by being supplied through a telephone line of a very high-data rate digital subscriber line (VDSL), wherein the service contents comprise audio/image signals from the telephone line, wherein the audio/image signals are transmitted to an MPEG data storing block, and wherein the plurality of digital set-top boxes of users further comprise an audio/image switching block for replaying through the television the service contents received from the MPEG data storing block and selected by the users, wherein each of the plurality of the digital set-top boxes comprises a screen generation block for employing an image signal of anyone channel among the plurality of channels of images signals from the audio/video switching block as a main screen and for employing the other channels of the image signals as a subsidiary screen, an OSD synthesizing block for realizing an appropriate graphic OSD on the screen from the screen generation block by comparing a content of an overlay memory of RGB divided in a predetermined ratio with a specific color key value, a video output block for displaying the image screen from the OSD synthesizing block to a television monitor, on audio digital/analog converting block for converting the audio signals of the active channels to the main screen supplied from the audio/video switching block, and an audio output block for outputting the sound from the audio digital/analog converting block to outside through a television speaker;

a number of system operating device installed by a predetermined region unit and connected to the plurality of digital set-top boxes of the users in a corresponding region via a telephone fine of the VDSL for supplying the service contents required at a corresponding set-top box in real time by the interactive data communication with an arbitrary digital set-top box; and a service providing device for storing various service contents received from a contents providing device and for supplying the corresponding service contents to a corresponding system operating device in real time in response to a service content request from the system operating device inputted through the Internet.

2. The system of claim 1, wherein the system operating device includes:

a storing block for storing the service contents supplied from the service providing device;

a media server for receiving the service contents supplied from the service providing device by connecting to the Internet through a cable or an optical cable and for temporally storing the same at the storing block and outputting the same;

a multi-point distribution unit for setting a plurality of transmission paths for the service contents outputted from the media server and outputting the same; and a private branch exchange for transmitting the service contents from the multi-point distribution unit to a corresponding digital set-top box through a is telephone line.

3. The system of claim 2, wherein the media server incorporates therein a function of a voice over Internet protocol (VOIP) router to implement the VOIP service.

4. The system of claim 2, wherein the media server and the multi-point distribution unit are connected to each other through a communication network.

5. The system of claim 4, wherein the transmission rate between the media server and the multi-point distribution unit is expressed in gigabits.

6. The system of claim 1, wherein the service providing device includes:

a first storing block for storing contents related to various services;

a streaming server for transmitting the service contents stored at the first storing block to the system operating device through the Internet and for inputting the inputted service contents to the first storing block;

a switching block installed between the first storing block and the streaming server for switching a is movement of the service contents between the first storing block and the streaming server;

a web/database server for transmitting the various service contents supplied from the contents providing device through the Internet to rho streaming server;

a second storing block for storing a subsidiary information of the service content stored at the first storing block; and a manager personal computer (PC) for implementing search, insert, delete, update and reconstruction for the subsidiary information stored at the second storing block by sending a data manipulation language (DML) to the web/database server.

7. The system of claim 6, wherein the first storing block are separated to a multiple number in a physical sense, but they are one storing space in a logical sense and are expandable.

8. The system of claim 6, wherein the steaming server is at least one.

9. The system of claim 6, wherein the subsidiary information stored at the second storing block is the serial number and position of each service contents, interface information of each service operating device, interface information of the contents providing device, charging information and information required for the operation of the other service providing devices.

10. The system of claim 1, wherein, in the digital set-top box, personal information, including name, address, the information of credit card, identification (ID) card information, of the user of a corresponding digital set-top box are additionally stored in the ROM or are stored at a memory including a magnetic card, an IC card or hardware or the like, and a device to access the magnetic card, IC card or hardware or the like is attached to the digital set-top box to be utilized as the personal information and security and charging information.

* * * * *